United States Patent
Offer et al.

(10) Patent No.: US 6,417,476 B1
(45) Date of Patent: Jul. 9, 2002

(54) APPARATUS AND METHODS FOR SUBMERGED PROCESSING OF A GROOVED WORK SURFACE USING A MOVABLE GATE

(75) Inventors: Henry P. Offer, Los Gatos; Siamak Bourbour, San Jose; Ron B. Ninomiya, San Jose; Bryan K. Chavez, San Jose, all of CA (US)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 09/590,676

(22) Filed: Jun. 9, 2000

(51) Int. Cl.$^7$ .................................................. B23K 9/00
(52) U.S. Cl. ........................................ 219/72; 405/12
(58) Field of Search ..................... 219/72, 136, 137 R, 219/74, 75; 277/648, 649; 405/11, 12, 13

(56) References Cited

U.S. PATENT DOCUMENTS

| | | | |
|---|---|---|---|
| 3,905,234 A | * | 9/1975 | Berghof |
| 4,039,798 A | * | 8/1977 | Lythall et al. ................. 219/72 |
| 4,052,632 A | * | 10/1977 | Sagara et al. ............. 219/137 R |
| 4,172,974 A | | 10/1979 | Stingelin et al. |
| 5,750,954 A | | 5/1998 | White et al. |
| 5,852,271 A | | 12/1998 | Offer |
| 6,255,616 B1 | | 7/2001 | Offer |

FOREIGN PATENT DOCUMENTS

JP          56-141965          11/1981

* cited by examiner

Primary Examiner—Clifford C. Shaw
(74) Attorney, Agent, or Firm—Nixon & Vanderhye

(57) ABSTRACT

A housing for an underwater processing device, for example, welding, includes a welding head movable laterally relative to the housing and the direction of the weld. At opposite ends, gates are provided having arcuate convex surfaces forming edge seals for engaging in the groove of the work surface. In one form, the gates are linearly slidable and biased in a direction away from the housing. In another form, the gates are pivotally mounted for engaging in the grooves. In both cases, the compliant seal about the margin of the housing, together with the arcuate seal of the gates, maintains a substantially water-free area within the housing to enable processing.

23 Claims, 5 Drawing Sheets

APPARATUS AND METHODS FOR SUBMERGED PROCESSING OF A GROOVED WORK SURFACE USING A MOVABLE GATE

BACKGROUND OF THE INVENTION

The present invention generally relates to apparatus and methods for submerged processing of a work surface and particularly relates to apparatus and methods for excluding a liquid from a work surface having a groove, thereby affording a local dry area along the groove and enabling submerged operation of the processing apparatus such as a welding torch, heating device or stress-relieving device along the groove.

Submerged or underwater processing applications such as welding, thermal stressing and the like require a local dry area around the processing head in order that water can be excluded from the work surface to be processed. For example, in submerged welding, the water must be excluded from the molten metal and nearby heated zone to prevent excessive oxidation, premature cooling and other defects. Inert gas is typically used to displace the water locally around the welding head and to provide a chemically inert atmosphere for the molten metal pool. The work surfaces in many underwater applications, such as in a nuclear reactor pressure vessel which has been in service or offshore petroleum or marine vessel activities such as construction, maintenance or repair, are generally not smooth or regular. For example, it is difficult to exclude water from within a groove formed by machining out a crack in the surface of an underwater component, especially after it has been partially or completely filled and then partially excavated for interim repair. A similar geometry-related problem exists when attempting to exclude water from a groove formed by edge preparation between two parts being joined.

Existing designs for water or other liquid exclusion devices for underwater applications have three basic principles of operation: (1) mechanically sealing the gap between the work surface and the application head, e.g., in a welding environment, a cup-shaped gas-filled component around the torch end; (2) flowing gas across the relatively small controlled-width gap between the work surface and the application head; or (3) providing a diverging water/gas cone or cylinder flow across a controlled gap to displace water within the contact area of the cone or cylinder against the work surface. Design variations combining these principles include a gas-permeable compliant seal for multiple concentric flowing water and gas cones/cylinders. The designs relying on a compliant seal have an inherently limited practical working range because an elastic element is deformed to provide compliance and this element has a limited strain range (before it deforms plastically or is fully compressed), as well as a significantly increasing force requirement for increasing displacement which must be overcome by applicator head manipulation to maintain the desired position along the contoured surface. The force requirement and high displacements may be reduced somewhat by employing thinner or softer deflecting seal elements. However, these thinner elements are increasingly prone to mechanical damage due to inadvertent overloading during use or by tearing during handling operations or while sliding over work surface disparities and discontinuities.

Designs relying on positive water or gas flow through a gap have the limitation that local contour changes or tilting of the applicator head typically generate a differential gap, resulting in the expected differential gas flow around the perimeter of the gap. When the gap is greater in one area, the flow rate and flow velocity of gases, particularly in the case of welding, also becomes greater at the expense of the flow rate and velocity in the remaining areas of the perimeter having a lesser gap. As the flow is reduced in the areas having a lesser gap, the flow rate falls below the minimum required to hold back the water without surging of the water/gas interface or, catastrophically, reverse flow of the water toward the dry welding or process zone within the applicator head housing occurs.

Existing water exclusion devices, however, are particularly and inherently inefficient for use over grooves in the surface of substrates since there is no provision either to limit the flow clearance between the device and the lowest portion of the groove as it is filled with the weld deposit. In the case of "flow curtain" types of devices, there is also no provision to provide a differential or separate flow over the groove which is greater than the needed amount away from the groove. As a result, the ability of known devices to exclude water using an internal flow rate below that which disturbs the welding process is limited at best or is ineffective at worst in the case of work surfaces having grooves. The effectiveness of these devices to exclude water from within deep grooves is limited. Even when used within the depth limit of the ability of these devices to exclude water in grooves, they are wasteful of purge fluid, typically high-purity inert gas, since the flow occurring in areas away from the groove is greater than required in the groove just to have sufficient flow over the groove itself. In the worst case, they are totally ineffective to exclude water from very deep grooves. Accordingly, there is a need to reliably exclude water from within shallow or deep grooves formed in submerged substrate materials without excessively high gas flow from within the device.

BRIEF SUMMARY OF THE INVENTION

In accordance with a preferred embodiment of the invention, there is provided a liquid exclusion apparatus surrounding an applicator head such as a welding torch or material processing device which has significant capability to reliably follow work surface contour changes without allowing liquid such as water to enter the dry area around the applicator head or work surface being processed. To accomplish the foregoing, the apparatus of the present invention includes a closed housing having an opening through a face of the housing for juxtaposition to the work surface and through which an applicator head, such as a welding torch or material processing device, may perform its intended function. In one preferred form hereof, the applicator head is carried by a slidable plate along another face of the housing opposite the opening such that the applicator head can be located at laterally different positions relative to the housing. The margin of the applicator opening about the housing is provided with a seal, for example, a wire mesh rope-type seal, to minimize or preclude water entry into the housing. In accordance with a preferred embodiment of the present invention, the housing is also provided with a pair of slidable gates. Each gate has a surface for extension from the side of the housing containing the applicator opening onto the work surface contour, e.g., a groove. The gate is biased by one or more springs to engage the sealing edge in the groove as the housing is moved along the work surface to exclude water from within the housing. With the bias applied to the sliding gate, the gate seal travels along the bottom of the groove forming a sufficient mechanical seal as the work surface contour of the groove changes. Processor purge gas flowing inside the exclusion device facing the work also displaces water from within the device through the controlled clearance, maintaining the work area water-free.

In an alternate form of the present invention, a pivoted or rotatable gate mounted to the housing is deployed. The pivoted gate, similar to the sliding gate, has an edge with sealing material for engaging and sealing against the contoured work surface, such as the groove. The rotating gate has the advantage of reducing the sliding friction force between the work surface and the contacting edge of the gate during weld progression along the groove since the angle between the gate and the work surface may be less than 90° at the beginning of the weld in the groove bottom and is reduced further as the groove is filled. As in the case of the sliding gate, purge gas is prevented from escaping excessively from the edges of the gate due to the containment action of the gate frame. Each pivoted gate is also movable toward and away from the work surface in addition to its pivotal movement.

Moreover, the present invention can successfully travel over the sloped beginning and end of grooves that do not extend around the full perimeter of the work surface to form an endless closed path. With the present invention, high gas flows typical of existing methods and devices which disturb the welding process by chilling or displacing the molten metal pool or are wasteful of the inert gas commonly used to provide the liquid/gas boundary at the perimeter of the device are avoided. That is, low gas flows may be used in the present invention which do not disturb the process being applied yet are sufficiently high to effectively displace the surrounding liquid in the gap between the exclusion device and the work surface. The present invention also prevents an excess of liquid vapor at the water liquid/gas interface from entering the weld zone which would otherwise likely react with the hot or liquid metal and cause weld defects.

In a preferred embodiment according to the present invention, there is provided apparatus for processing a work surface having a groove, comprising a closed housing having an opening and movable relative to the work surface in the direction of the groove, a working head carried by the housing for processing the surface through the opening, a seal about margins of the housing for sealing against the work surface about the opening and at least one gate having a sealing edge and carried by the housing for movement into a position extending from the housing for engaging the groove and means for biasing the gate for movement into the extended position.

In a further preferred embodiment according to the present invention, there is provided in an apparatus for processing a submerged work surface having a closed housing, an opening, a working head within the housing and a pair of gates carried by the housing mounted for movement relative to the housing, a method for excluding fluid from the work surface, comprising the steps of extending the gates substantially independently of one another relative to the housing, enabling seals along edges of the gates to engage or lie in close proximity to the submerged groove in an extended position of the gates, advancing the housing along the work surface with the edges of the gates following the contour of the groove of the work surface and movable independently of one another to substantially exclude fluid from the work surface exposed to the working head within the housing and operating the working head to process the work surface through the opening as the housing is advanced along the work surface.

DETAILED DESCRIPTION OF THE INVENTION

Figure 1:
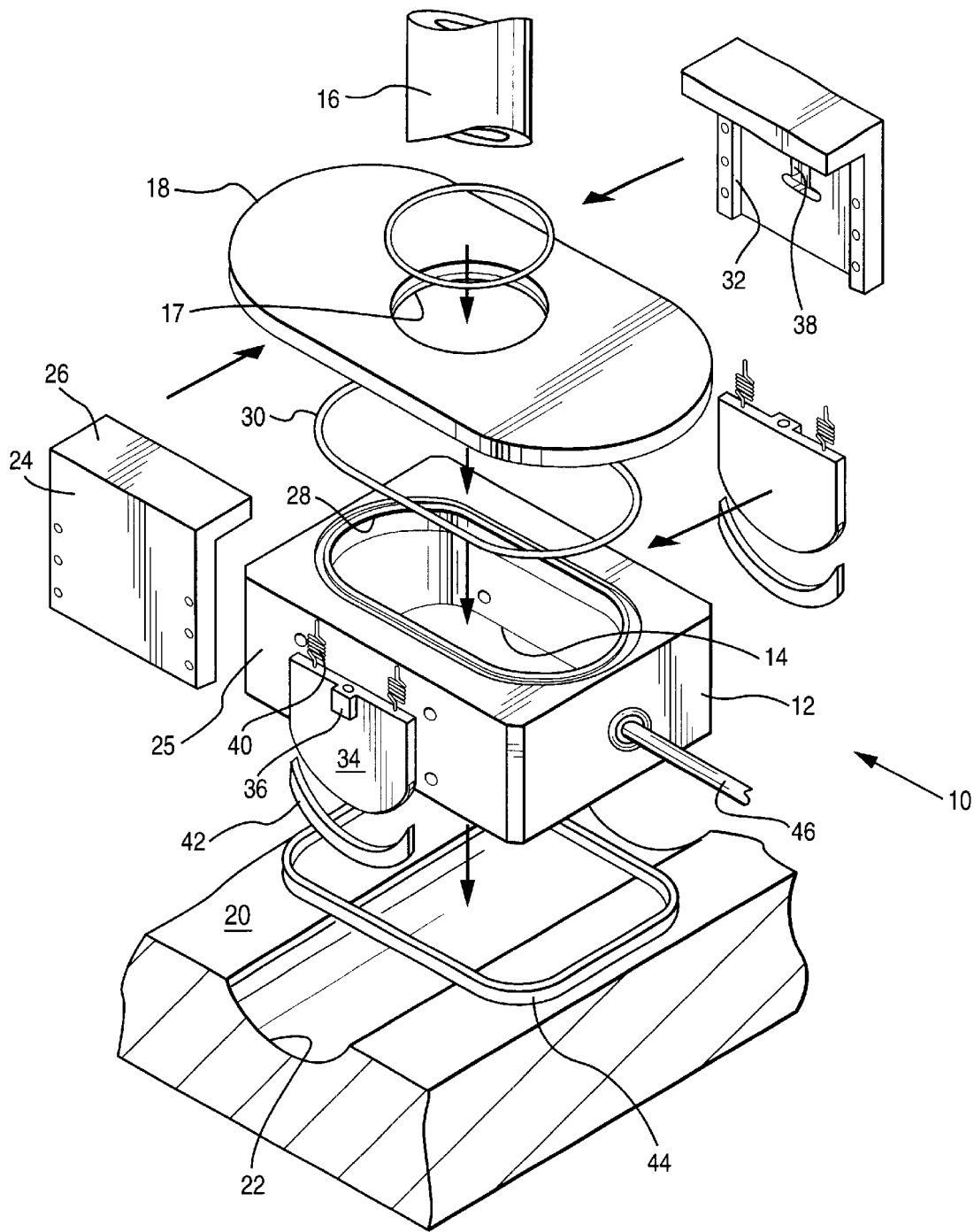
FIG. 1 is an exploded perspective view of various parts of an exclusion device for submerged processing applications constructed in accordance with a preferred embodiment of the present invention.
Figure 4:
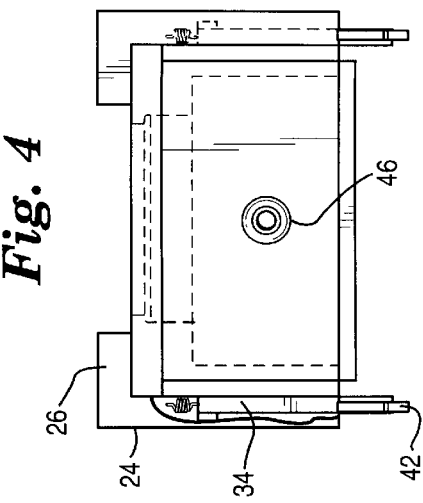
FIG. 4 is a side elevational view illustrating an auxiliary inert gas inlet.
Figure 2:
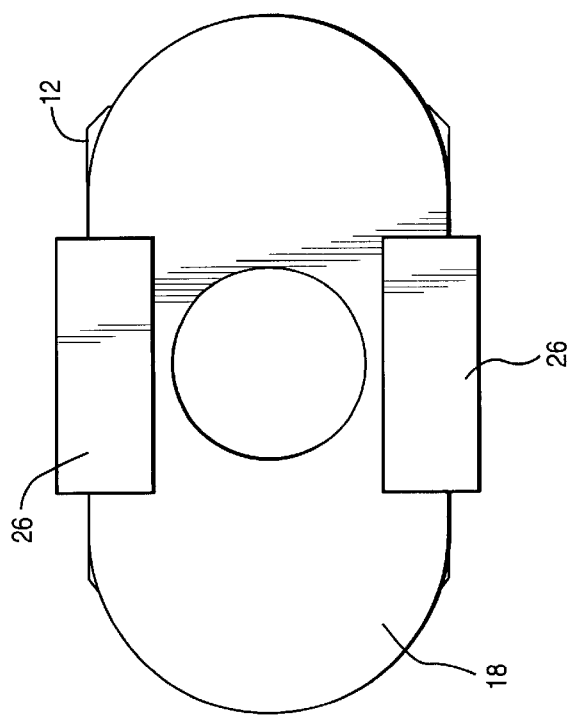
FIG. 2 is a top plan view thereof.
Figure 3:
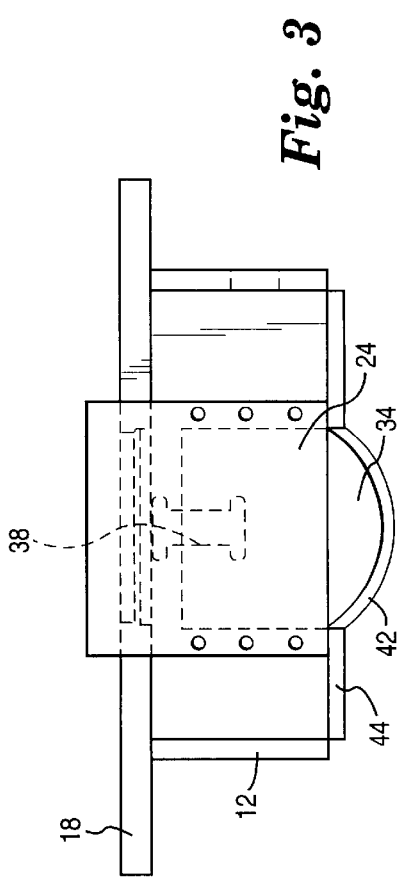
FIG. 3 is an end elevational view thereof.
Figure 5:
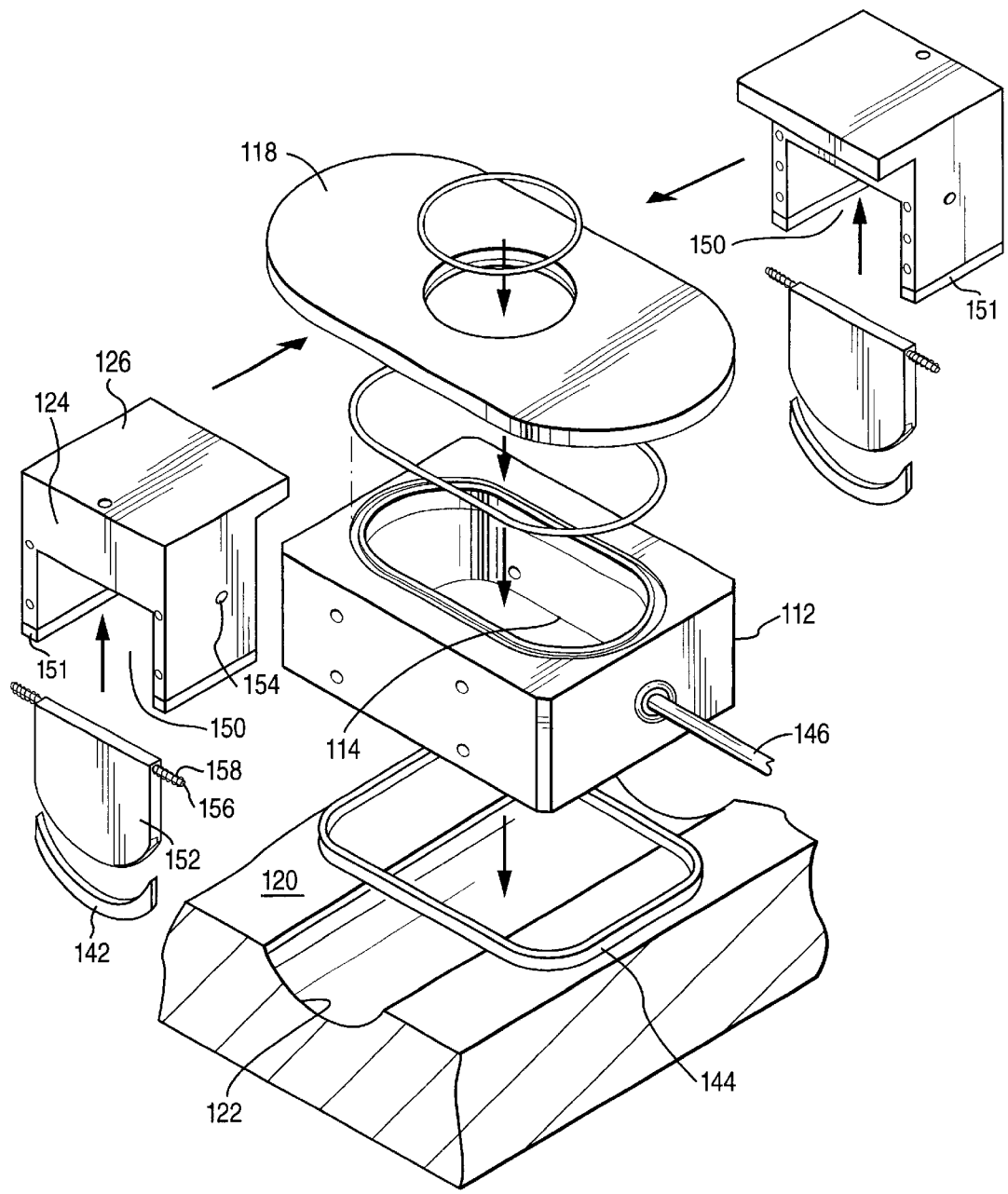
FIG. 5 is a view similar to FIG. 1 illustrating a further form of the present invention.
Figure 6:
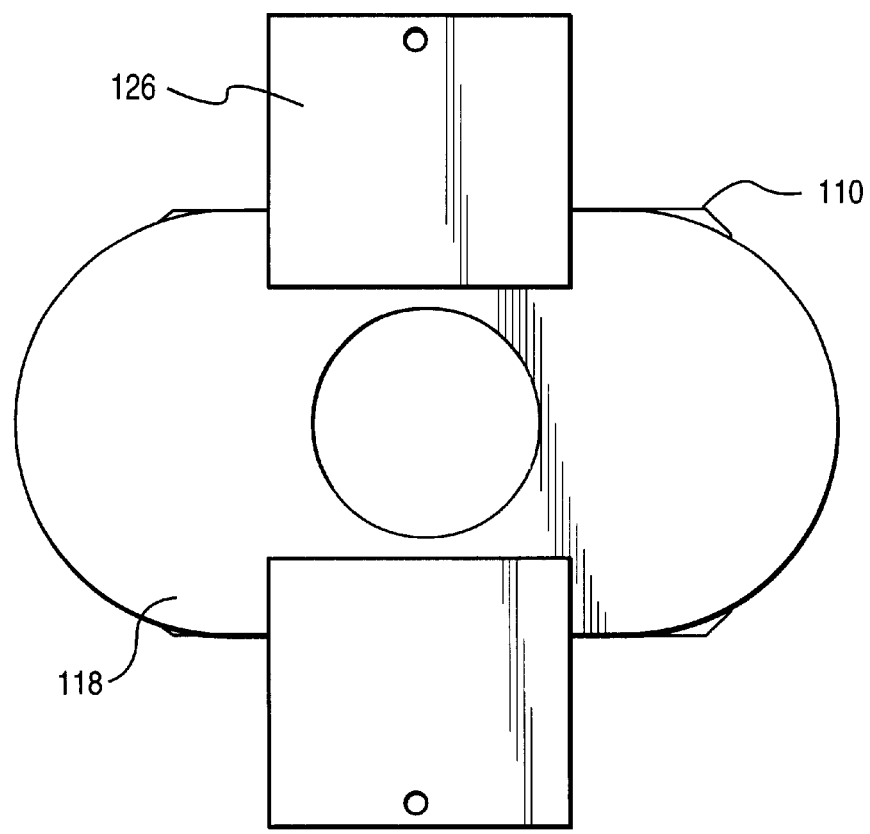
FIG. 6 is a top plan view thereof.
Figure 7:
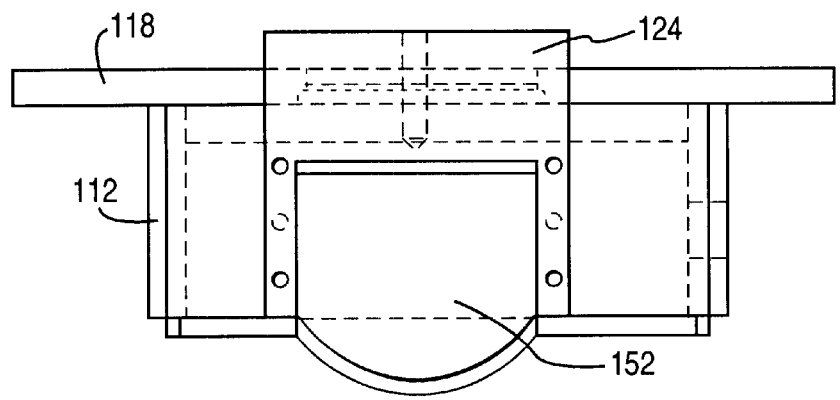
FIG. 7 is an end elevational view thereof.
Figure 8:
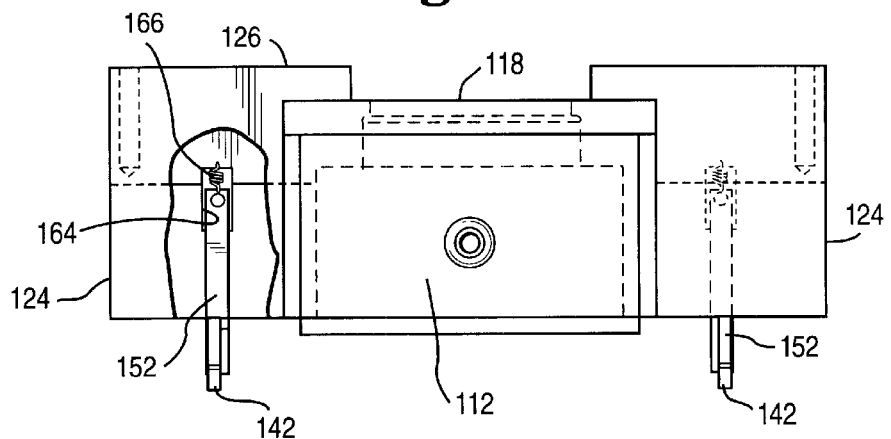
FIGS. 8 and 9 are end views of the exclusion device illustrating the various positions of a rotatable gate in accordance with a further preferred embodiment of the present invention.

Referring now to the drawings, particularly to FIG. 1, there is illustrated an exclusion device for underwater or submerged processing applications, generally designated 10. It will be appreciated that the underwater apparatus may be employed for a variety of applications, for example, welding, water-jet cleaning, thermal-based surface residual-stress improvement and other types of applications. The present description, however, refers to a particular application of the present invention to underwater welding and it will be appreciated that the invention is not therefore limited to underwater welding but embraces other applications.

The apparatus 10 includes a housing 12 closed at its top, sides and ends and having an opening 14 through its lower end. The apparatus 10 also includes an applicator head 16 which is received through an opening 17 in a plate 18 mounted on the top of housing 12. The applicator head 16 is located within the housing 12 in position to process the work surface 20 and particularly the groove 22 in the work surface 20 through the lower open end 14 of housing 12. It will be appreciated that the applicator head 16 may be of several different types, depending upon the process which is being applied, and, e.g., may comprise a welding head for processing the groove 22 of the work surface. It will be appreciated from a review of FIG. 1 that the groove 22 extends generally longitudinally and has an arcuate concave configuration.

The housing 12 also includes end wall retainer plates or gatekeepers 24 along opposite ends 25 of the housing 12, the housing ends 25 facing in a direction of longitudinal movement of the apparatus along the groove 22 when processing groove 22. The retainer plates 24 are inverted, generally L-shaped, members having a guide member 26, e.g., a flange, overlying the top plate 18 disposed on the housing 12. The top plate 18 overlies an opening 28 through the top of housing 12 and is sealed to the housing by seals 30. However, the plate 18 is movable in a lateral direction, relative to groove 22, along with the applicator head 16 carried plate 18 such that the applicator head 16 may be positioned laterally at different locations within the housing 12 and hence at different lateral locations relative to the groove 22.

The inside faces of the retainer plates 24 each have a slot 32 for receiving and retaining a slidable gate 34 between the end wall of housing 12 and a wall of retainer plate 24. The slidable gates 34 have guides, i.e., projections 36, for reception in corresponding guide slots 38, formed along the interior faces of the retainer plate walls. Means are provided for biasing the gates for movement in a direction away from the housing and, in use, toward the groove 22. The biasing means may comprise one or more springs 40 disposed between the upper edge of each sliding gate 34 and the flange 26 for biasing the sliding gate 34 for movement in a direction away from the housing 12 and, in use, toward groove 22. As illustrated, the lower edge of each slidable gate 34 includes a compliant sealing edge 42 for engaging in the groove 22 of the work surface 20. Thus, it will be appreciated that when the housing 12 is applied against the work surface 20, the springs 40 bias each sliding gate 34 for movement to an extended position such that the seal edge 42 projects from housing 12 to engage in the groove 22 of the work surface 20. The springs 40 may be of any type, for example, a sinuously bent leaf spring extending along the upper edge of the sliding gate and cooperable between that edge and the underside of flange 26 may be used. Other types of biasing means may be employed in lieu of springs, such as fluid or gas-actuated cylinders or chambers. The housing 12 is also provided with a compliant seal 44 about its margin for engaging along the work surface 22. Additionally, the housing 12 has, an auxiliary gas inlet 46 whereby inert gas can be supplied to the interior of the housing 12 in addition to the gas supplied to the applicator head 16 during welding for purposes of maintaining appropriate pressure for water exclusion.

In use, the housing is applied against the work surface 20 and maintained against that surface by gas pressure within the housing or by mechanical means, such as spring cylinders or motors or fluid reaction forces such as water jets. With the springs biasing the sliding gates into extended positions, it will be appreciated that the seal 44 about the housing and the gate seal edge 42 provide a physical barrier between the housing and the work surface, including within the groove 22, and control the gap or clearance between the housing edge and the work surface within the groove. As the groove is processed, for example, filled with weld material, the sliding gate 34 moves to accommodate the changing contour of the groove. For example, the sliding gate is automatically displaced toward the housing 12 as the groove becomes filled or away from the housing if the groove deepens. Moreover, the retainer plate 18 carrying the applicator head 16 enables the welding head 16 to travel along two orthogonally-related axes, i.e., longitudinally along the groove with the housing 12 and laterally of the groove by the sliding movement of retainer plate 18 relative to the housing 12. As the housing approaches the end of the work surface and groove, the housing can also travel over the sloped beginning and end surfaces of the grooves. Additionally, the gas flow into the housing as a result of the foregoing-described configuration of the housing and sliding gates may be sufficiently low so as not to disturb the process being applied to the work surface, yet is sufficiently high to effectively displace outwardly the surrounding liquid in the gap between the exclusion device and the work surface. When welding, the housing seals and gate seals also prevent an excess of liquid vapor at the water liquid/gas interface from entering the weld zone which would likely react with the hot or liquid metal and cause weld defects.

Referring now to the embodiment hereof illustrated in FIGS. 5–9, wherein like reference numerals are applied to like parts preceded by the numeral prefix "1," there is provided a similarly shaped and configured housing 112 mounting a slidable retainer plate 118 along a top surface thereof for mounting the applicator head. In this form of the invention, however, the gates are pivotally mounted rather than slidably mounted as in the preceding embodiment. To accomplish this, there are provided along opposite ends of the housing 112, gatekeepers 124 which project substantially from the end walls of housing 112 defining a gate cavity 150 opening in the direction of the lower opening 114 through housing 112. The gatekeeper 124 includes a flange 126 for overlying the slidable plate 118 whereby the applicator head carried by retainer plate 118 can be displaced laterally relative to the housing 112. The gatekeepers 124 also mount compliant seals 151 along their lower edges to seal along the working surface 120.

Figure 9:
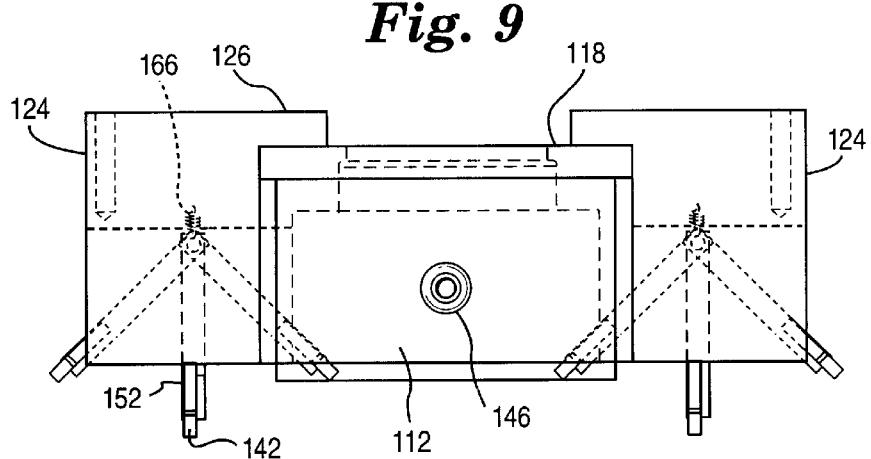

Gatekeepers 124 house pivotal gates 152. Each gate 152 includes a compliant seal edge 142 along its arcuate lower edge for projection below the housing 112. Openings 154 are provided in the side walls of the gatekeepers 124 for pivotally mounting the gates 152. Particularly, the gates 152 include a pair of pins 156 projecting laterally and about which are provided springs 158, both the springs and pins being received in the openings 154. A hub may be used for receiving the springs and pins. The gates 152 therefore pivotally depend from the gatekeepers 124 and the springs 158 bias the gates into a neutral position from rotated positions to either side of the neutral position as illustrated in FIG. 9, depending directly below the housing 112. Upon rotational movement of gates 152 in either direction from the neutral position, the gates are biased for return to the neutral position by the springs 158.

In using this embodiment of water exclusion device, the housing and gates are deployed against the work surface 120. The gates may be pivoted in a forward or rearward direction for engaging in the groove 122 and preferably the forward or leading gate is pivoted in the direction of movement of the device, while the aft or trailing gate is pivoted in a direction away from the device. It will be appreciated, however, that both gates can be pivoted in a trailing direction relative to the movement of the device along the groove 122. The compliant seals 144, 142 and 151 bear against the work surface and assist to maintain the water from the interior of the housing 112. The purge gas flowing through the auxiliary purge gas inlet 146 assists to exclude water from within the device.

Figure 10:
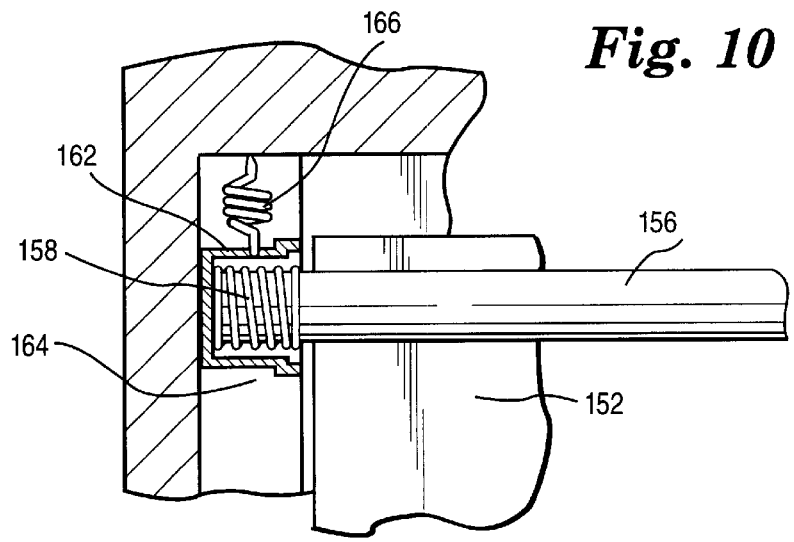
FIG. 10 is an enlarged fragmentary view with parts in cross-section of an end connection for the rotatable gate.

In addition to the rotary movement of the gates 152, the gates may also be mounted for linear sliding movement as well as rotational movement as illustrated in FIG. 10. To accomplish this, the pin ends 156 and springs 158 may be received, instead of in openings 154, in hubs 162 disposed in slots 164 extending along the interior walls of the gatekeepers 124. The hubs 162 are preferably rectilinear in an axial direction and therefore do not rotate in slots 164. Springs 166 may be interposed between the hubs 162 and the upper ends of the slots to bias the rotatable gates in a downward direction while the springs 158 bias the gate for pivotal movement into its neutral position. It will be appreciated that the rotation of the gates reduces the sliding frictional force between the work surface and the edges of the gates during weld progression since the angle between the gate and the work surface may be less than 90° at the beginning of the weld in the groove bottom and is reduced further as the groove is filled.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for processing a work surface having a groove, comprising:
   a closed housing having an opening and movable relative to the work surface in the direction of the groove;
   a working head carried by said housing for processing said surface through said opening;
   a seal about margins of the housing for sealing against the work surface about the opening;
   at least one gate having a sealing edge and carried by said housing for movement into a position extending from said housing for engaging said groove;
   means for biasing said gate for movement into said extended position;
   a mounting plate for said head; and
   a guide member for enabling movement of said mounting plate and said working head relative to said housing in a direction generally normal to the direction of movement of the housing along the groove.

2. Apparatus according to claim 1 wherein said one gate is movable in a linear direction relative to said housing into said extended position.

3. Apparatus according to claim 1 wherein said sealing edge of said one gate has a generally arcuate configuration.

4. Apparatus according to claim 1 including a guide carried by said housing and said one gate for guiding said one gate for linear movement along said housing and into said extended position.

5. Apparatus according to claim 1 including a gatekeeper for housing said gate externally of said housing.

6. Apparatus according to claim 1 wherein said biasing means comprises a spring.

7. Apparatus according to claim 1 wherein said sealing edge of said one gate has a generally arcuate configuration, a guide carried by said housing and said one gate for guiding said one gate for linear movement along said housing and into said extended position.

8. Apparatus according to claim 1 wherein said working head includes a welding torch.

9. Apparatus according to claim 1 including a second gate on a side of said housing opposite said first gate and carried for movement into a position extending from said housing for engaging said groove, second means for biasing said second gate for movement into said extended position, said second gate having a sealing edge extending below said housing for engaging the groove in said extended position thereof and for locating said second sealing edge in the groove.

10. Apparatus according to claim 1 wherein said gate is pivoted to said housing.

11. Apparatus according to claim 10 wherein said biasing means biases said gate for movement toward a position extending generally normal to said work surface.

12. Apparatus according to claim 1 including a second gate on a side of said housing opposite said first gate and pivotally carried for movement into a position extending from said housing for engaging said groove, means for biasing said second gate for movement into an extended position, the first mentioned and said second gate having sealing edges extending below said housing for engaging the groove in the extended positions thereof and for locating said seals in the groove.

13. Apparatus according to claim 12 wherein said biasing means includes springs biasing said gates for movement in opposite directions toward an extended neutral position.

14. Apparatus according to claim 1 wherein said working head is mounted for sliding movement relative to said housing.

15. In an apparatus for processing a submerged work surface having a closed housing, an opening, a working head within said housing and a pair of gates carried by said housing mounted for movement relative to said housing, a method for excluding fluid from the work surface, comprising the steps of:
   extending the gates substantially independently of one another relative to the housing, enabling seals along edges of the gates to engage or lie in close proximity to the submerged groove in an extended position of said gates;
   advancing the housing along the work surface with the edges of the gates following the contour of the groove of the work surface and movable independently of one another to substantially exclude fluid from the work surface exposed to the working head within the housing;
   operating the working head to process the work surface through said opening as the housing is advanced along the work surface; and
   displacing the working head in a lateral direction relative to the movement of the housing along the work surface.

16. A method according to claim 15 including biasing the gates for linear movement in a direction away from said housing and toward said groove.

17. A method according to claim 15 including biasing the gates for pivotal movement into positions having respective edges engaging in the groove.

18. A method according to claim 15 including biasing the gates for pivotal movement about axes transverse to the direction of advance of the housing along the work surface and for movement toward and away from the work surface.

19. Apparatus for processing a work surface having a groove, comprising:
   a closed housing having an opening and movable relative to the work surface in the direction of the groove;
   a working head carried by said housing for processing said surface through said opening;
   a seal about margins of the housing for sealing against the work surface about the opening;
   at least one gate having a sealing edge and carried by said housing for pivotal movement into a position extending from said housing for engaging said groove; and
   means for biasing said gate for movement into said extended position.

20. Apparatus according to claim 19 wherein said biasing means biases said gate for movement toward a position extending generally normal to said work surface.

21. Apparatus according to claim 19 wherein said one gate is movable in a linear direction relative to said housing into said extended position.

22. Apparatus according to claim 19 including a second gate on a side of said housing opposite said first gate and pivotally carried for movement into a position extending from said housing for engaging said groove, means for biasing said second gate for movement into an extended position, said one gate and said second gate having sealing edges extending below said housing for engaging the groove in the extended positions thereof and for locating said seals in the groove.

23. Apparatus according to claim 22 wherein said biasing means includes springs biasing said gates for movement in opposite directions toward an extended neutral position.

* * * * *